United States Patent
Miyoshi et al.

(10) Patent No.: US 7,951,891 B2
(45) Date of Patent: May 31, 2011

(54) SILICONE RESIN COMPOSITION FOR DIE BONDING

(75) Inventors: Kei Miyoshi, Annaka (JP); Tomoyuki Goto, Annaka (JP); Naoki Yamakawa, Takasaki (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 618 days.

(21) Appl. No.: 11/447,100

(22) Filed: Jun. 6, 2006

(65) Prior Publication Data

US 2006/0275617 A1    Dec. 7, 2006

(30) Foreign Application Priority Data

Jun. 7, 2005  (JP) ................. 2005-166824

(51) Int. Cl.
C08G 77/00 (2006.01)
C08G 77/04 (2006.01)
C08G 77/12 (2006.01)
C08G 77/20 (2006.01)
C08F 283/00 (2006.01)

(52) U.S. Cl. ............... 528/12; 528/10; 528/15; 528/31; 528/32; 528/33; 525/478

(58) Field of Classification Search .......... 525/478; 528/10, 15, 31–33, 12; 428/447–448
See application file for complete search history.

(56) References Cited

U.S. PATENT DOCUMENTS

| | | | | |
|---|---|---|---|---|
| 3,699,073 A * | 10/1972 | Wade et al. | ................ | 524/785 |
| 3,814,730 A * | 6/1974 | Karstedt | ................ | 528/15 |
| 4,293,671 A * | 10/1981 | Sasaki et al. | ................ | 525/478 |
| 4,528,314 A * | 7/1985 | Modic | ................ | 524/407 |
| 4,988,779 A * | 1/1991 | Medford et al. | ................ | 525/478 |
| 5,466,532 A * | 11/1995 | Wengrovius et al. | ......... | 428/447 |
| 5,545,700 A * | 8/1996 | Mealey et al. | ................ | 525/478 |
| 5,611,884 A * | 3/1997 | Bearinger et al. | ........... | 156/325 |
| 5,739,199 A * | 4/1998 | Eguchi et al. | ................ | 524/493 |
| 5,961,770 A * | 10/1999 | Cifuentes et al. | ............ | 156/329 |
| 5,977,226 A * | 11/1999 | Dent et al. | ................ | 524/267 |
| 6,124,407 A * | 9/2000 | Lee et al. | ................ | 525/478 |
| 6,784,555 B2 * | 8/2004 | Watson | ................ | 257/783 |
| 6,815,076 B2 * | 11/2004 | Aoki | ................ | 428/448 |
| 7,521,813 B2 * | 4/2009 | Kashiwagi et al. | ........... | 257/791 |
| 2002/0161140 A1 | 10/2002 | Yoneda et al. | | |
| 2004/0116640 A1 * | 6/2004 | Miyoshi | ................ | 528/12 |
| 2004/0122142 A1 * | 6/2004 | Meguriya | ................ | 524/268 |
| 2004/0178509 A1 * | 9/2004 | Yoshino et al. | ................ | 257/780 |
| 2005/0006794 A1 * | 1/2005 | Kashiwagi et al. | .......... | 257/788 |
| 2005/0061437 A1 | 3/2005 | Goto et al. | | |

FOREIGN PATENT DOCUMENTS

| | | |
|---|---|---|
| EP | 1 424 363 A1 | 6/2004 |
| EP | 1 544 253 A2 | 6/2005 |
| JP | 11-1619 | 1/1999 |

* cited by examiner

*Primary Examiner* — Randy Gulakowski
*Assistant Examiner* — Robert Loewe
(74) *Attorney, Agent, or Firm* — Oblon, Spivak, McClelland, Maier & Neustadt, L.L.P.

(57) ABSTRACT

A silicone resin composition for die bonding is provided. The composition includes (A) a straight-chain organopolysiloxane having silicon-bonded alkenyl groups, and with a viscosity of no more than 1,000 mPa·s, (B) a three dimensional network-type organopolysiloxane resin that is either wax-like or solid at 23° C., (C) an organohydrogenpolysiloxane having SiH groups, and (D) a platinum-group metal-based catalyst. The composition produces a cured product with a high hardness, and good heat resistance, transparency, and light transmittance in the low wavelength region.

17 Claims, No Drawings

SILICONE RESIN COMPOSITION FOR DIE BONDING

BACKGROUND OF THE INVENTION

1. Field of the Invention

The present invention relates to a silicone resin composition that is useful for die bonding light emitting diode (hereafter abbreviated as LED) elements or the like.

2. Description of the Prior Art

Conventionally, epoxy resins are used as LED element sealing materials and die bonding materials (namely, adhesive materials for bonding together a die such as an LED element and a substrate such as a package). Particularly in the case of a die bonding material, if the resin is too soft, then a problem arises in that bonding cannot be achieved during the wire bonding process that is conducted following the die bonding process, and consequently, conventional die bonding materials have used an epoxy resin that is an adhesive with a high degree of hardness. However, when a sealing material or die bonding material comprising an epoxy resin is used with a blue LED or white LED or the like, the strong ultraviolet light can cause the resin to yellow and absorb light, which creates durability problems, including a tendency for the luminance of the LED to decrease.

In recent years, expectations regarding the durability of LEDs have increased, and sealing materials for LED elements are changing from epoxy resins to more durable silicone resins. In a similar manner to sealing materials, greater durability is also being demanded of die bonding materials. Furthermore, it is expected that further improvements in both the luminance and the heat resistance of die bonding materials will be required. Moreover, from the viewpoints of luster and coloring properties, there is also a possibility that ultraviolet light-emitting LEDs will also become widely used in the future.

SUMMARY OF THE INVENTION

The present invention takes the above circumstances into consideration, with an object of providing a silicone resin composition that is useful for die bonding LED elements and the like, and is capable of producing a cured product that exhibits a high degree of hardness, and excellent levels of heat resistance, transparency, and light transmittance in the low wavelength region.

As a result of intensive efforts aimed at achieving the above object, the inventors of the present invention were able to complete the present invention. In other words, the present invention provides a silicone resin composition for die bonding, comprising:

(A) a straight-chain organopolysiloxane having at least 2 alkenyl groups bonded to silicon atoms within each molecule, and with a viscosity at 25° C. of no more than 1,000 mPa·s, (B) a three dimensional network-type organopolysiloxane resin that is either wax-like (that is, a highly viscous liquid) or solid at 23° C., represented by an average composition formula (1) shown below:

$$(R^2{}_3SiO_{1/2})_l(R^1R^2{}_2SiO_{1/2})_m(R^1R^2{}_2SiO)_n(R^2{}_2SiO)_p (R^1SiO_{3/2})_q(R^2SiO_{3/2})_r(SiO_{4/2})_s \qquad (1)$$

(wherein, each $R^1$ represents, independently, an alkenyl group, each $R^2$ represents, independently, an unsubstituted or substituted monovalent hydrocarbon group that contains no alkenyl groups, and at least 80 mol % of all the $R^2$ groups are methyl groups, l, m, n, p, q, r, and s are numbers that satisfy $l \geq 0$, $m \geq 0$, $n \geq 0$, $p \geq 0$, $q \geq 0$, $r \geq 0$, and $s \geq 0$ respectively, and also satisfy m+n+q>0, q+r+s>0, and l+m+n+p+q+r+s=1), in sufficient quantity to provide from 60 to 90 parts by mass of the component (B) per 100 parts by mass of the combination of the component (A) and the component (B), (C) an organohydrogenpolysiloxane having at least 2 hydrogen atoms bonded to silicon atoms within each molecule, represented by an average composition formula (2) shown below:

$$R^3{}_aH_bSiO_{(4-a-b)/2} \qquad (2)$$

(wherein, each $R^3$ represents, independently, an unsubstituted or substituted monovalent hydrocarbon group that contains no alkenyl groups, at least 50 mol % of all $R^3$ groups are methyl groups, a is a number that satisfies $0.7 \leq a \leq 2.1$, b is a number that satisfies $0.001 \leq b \leq 1.0$, and a+b represents a number that satisfies $0.8 \leq a+b \leq 3.0$), in sufficient quantity to provide from 0.5 to 5.0 mols of hydrogen atoms bonded to silicon atoms within the component (C) for every 1 mol of silicon atom-bonded alkenyl groups within the combination of the component (A) and the component (B), and (D) an effective quantity of a platinum-group metal-based catalyst.

A composition of the present invention is capable of producing a cured product that exhibits a high degree of hardness (a Shore D hardness of at least 30 in a preferred embodiment), excellent levels of heat resistance, transparency, and light transmittance in the low wavelength region (particularly in the region from 300 to 500 nm), and is particularly useful as a die bonding material for use in the die bonding of LED elements and the like.

DETAILED DESCRIPTION OF THE PREFERRED EMBODIMENTS

A composition of the present invention comprises the components (A) through (D) described below.

As follows is a more detailed description of each component. In the following description, "Me" represents a methyl group, and "Vi" represents a vinyl group.

<Component (A)>

The component (A) is a component for imparting stress relaxation following curing of the composition. The component (A) is an organopolysiloxane with a basically straight-chain molecular structure, in which the principal chain typically comprises repeating diorganosiloxane units and both the molecular chain terminals are blocked with triorganosiloxy groups, wherein the structure contains at least 2, and preferably from 2 to 10, and even more preferably from 2 to 5, alkenyl groups bonded to silicon atoms within each molecule, and the viscosity at 25° C. is no more than 1,000 mPa·s (typically within a range from 1 to 1,000 mPa·s), and preferably no more than 700 mPa·s (for example, from 5 to 700 mPa·s). If the viscosity exceeds 1,000 mPa·s, then this component becomes overly active as a soft segment, meaning obtaining the targeted degree of hardness becomes difficult.

The alkenyl groups bonded to silicon atoms typically contain from 2 to 8, and preferably from 2 to 4 carbon atoms. Specific examples of these groups include vinyl groups, allyl groups, butenyl groups, pentenyl groups, hexenyl groups, and heptenyl groups, although vinyl groups are preferred.

These alkenyl groups bonded to silicon atoms may exist at either the molecular chain terminals or non-terminal positions within the molecular chain (that is, molecular chain side chains) of the organopolysiloxane of the component (A), or may also exist at both these locations, although structures in which the alkenyl groups exist at least at both molecular chain terminals are preferred.

In the organopolysiloxane molecule of the component (A), there are no particular restrictions on organic groups bonded to silicon atoms other than the aforementioned alkenyl groups, provided these organic groups contain no aliphatic unsaturated bonds, and examples of these organic groups include unsubstituted or substituted monovalent hydrocarbon groups, typically of 1 to 12, and preferably 1 to 10, carbon atoms. Specific examples of these unsubstituted or substituted monovalent hydrocarbon groups include alkyl groups such as methyl groups, ethyl groups, propyl groups, butyl groups, pentyl groups, hexyl groups, and heptyl groups; cycloalkyl groups such as cyclohexyl groups; aryl groups such as phenyl groups, tolyl groups, xylyl groups, and naphthyl groups; aralkyl groups such as benzyl groups and phenethyl groups; and groups in which either a portion of, or all of, the hydrogen atoms within these groups have been substituted with a halogen atom such as a chlorine atom, fluorine atom, or bromine atom, including halogenated alkyl groups such as chloromethyl groups, 3-chloropropyl groups, and 3,3,3-trifluoropropyl groups, although of these, alkyl groups are preferred, and methyl groups are particularly desirable.

Examples of the organopolysiloxane of the component (A) include materials represented by an average composition formula (3) shown below:

$$R^4_c R^5_d SiO_{(4-c-d)/2} \quad (3)$$

(wherein, each $R^4$ represents, independently, an unsubstituted or substituted monovalent hydrocarbon group that contains no aliphatic unsaturated bonds, each $R^5$ represents, independently, an alkenyl group, c represents a number from 1.9 to 2.1, d represents a number from 0.005 to 1.0, and c+d represents a number within a range from 1.95 to 3.0).

In the average composition formula (3) shown above, the unsubstituted or substituted monovalent hydrocarbon groups that contain no aliphatic unsaturated bonds represented by $R^4$ are similar to those groups listed above as examples of silicon atom-bonded organic groups other than the aforementioned alkenyl groups.

The alkenyl groups represented by $R^5$ are similar to those groups listed above as examples of the aforementioned alkenyl groups bonded to silicon atoms.

c is preferably a number from 1.95 to 2.00, d is preferably a number from 0.01 to 0.5, and c+d preferably satisfies a range from 1.98 to 2.5.

Examples of the organopolysiloxane of the component (A) include compounds represented by general formulas (4) and (5) shown below:

(wherein, each $R^6$ represents, independently, an unsubstituted or substituted monovalent hydrocarbon group that contains no aliphatic unsaturated bonds, e represents an integer within a range from 0 to 200, and preferably from 3 to 120, f represents an integer within a range from 1 to 10, and preferably from 1 to 5, and g represents an integer within a range from 0 to 200, and preferably from 3 to 110, and these definitions also apply below), as well as compounds represented by the general formulas shown below:

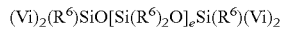

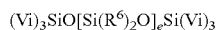

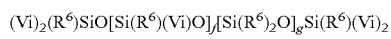

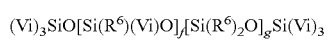

wherein, $R^6$, e, f and g are all as defined above in relation to the average composition formulas (4) and (5)

Specific examples of the component (A) include the compounds shown below.

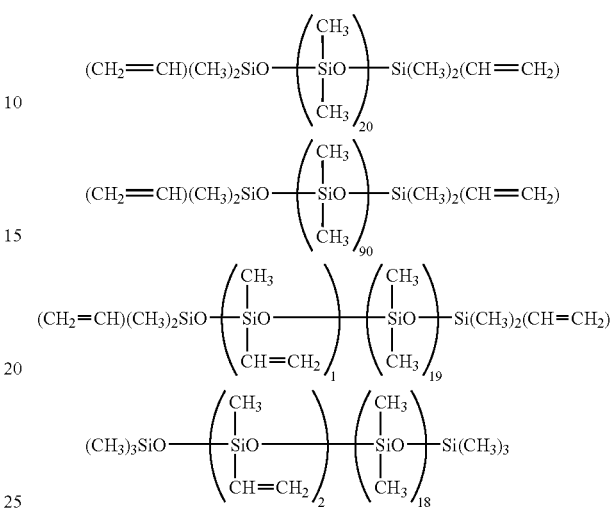

In the above general formulas, the unsubstituted or substituted monovalent hydrocarbon groups represented by $R^6$ preferably contain from 1 to 10, and even more preferably from 1 to 6 carbon atoms. Specific examples include similar groups to those listed above as examples of organic groups bonded to silicon atoms other than the alkenyl groups, with the exception of the aryl groups and aralkyl groups, although alkyl groups are preferred, and methyl groups are particularly desirable, as they yield superior levels of light resistance and heat resistance for the cured product.

The component (A) may be used either alone, or in combinations of two or more different compounds.

<Component (B)>

The component (B) is a component for providing increased reinforcement while retaining the transparency of the cured product. The component (B) is represented by the average composition formula (1) shown above, and is a three dimensional network-type organopolysiloxane resin which is wax-like or solid at 23° C., and comprises alkenyl groups bonded to silicon atoms, trifunctional siloxane units, and/or $SiO_{4/2}$ units as essential structures within the molecule. The term "wax-like" refers to a gum-like (crude rubber-like) form that exhibits almost no self-fluidity and has a viscosity at 23° C. of at least 10,000,000 mPa·s, and particularly of 100,000,000 mPa·s or higher.

In the above average composition formula (1), the alkenyl groups represented by $R^1$ are similar to those groups listed above as examples of the alkenyl groups bonded to silicon atoms within the component (A), although in terms of ease of availability and cost, vinyl groups are preferred.

The monovalent hydrocarbon groups that contain no alkenyl groups represented by $R^2$ are similar to those groups listed above as examples of organic groups bonded to silicon atoms other than the alkenyl groups within the component (A), although at least 80 mol % (from 80 to 100 mol %), typically from 90 to 100 mol %, and even more typically from 98 to 100 mol %, of all the $R^2$ groups are methyl groups. If the proportion of methyl groups is less than 80 mol % of all the $R^2$ groups, then the compatibility with the component (A) deteriorates, which can cause the composition to become turbid, making it impossible to obtain the desired highly transparent cured product.

l is preferably a number from 0 to 0.65, m is preferably from 0 to 0.65, n is preferably from 0 to 0.5, p is preferably from 0 to 0.5, q is preferably from 0 to 0.8, r is preferably from 0 to 0.8, and s is preferably from 0 to 0.6. Furthermore, m+n+q is preferably a number within a range from 0.1 to 0.8, and even more preferably from 0.2 to 0.65, and q+r+s is preferably a number within a range from 0.1 to 0.8, and even more preferably from 0.2 to 0.6.

In the component (B), the quantity of alkenyl groups bonded to silicon atoms is preferably within a range from 0.01 to 1 mol, and even more preferably from 0.05 to 0.5 mols, per 100 g of the component (B). Provided the quantity of alkenyl groups satisfies this range from 0.01 to 1 mol, the cross-linking reaction proceeds adequately, enabling a cured product with a higher degree of hardness to be obtained.

The organopolysiloxane resin of the component (B) is preferably represented by one of the formulas shown below.

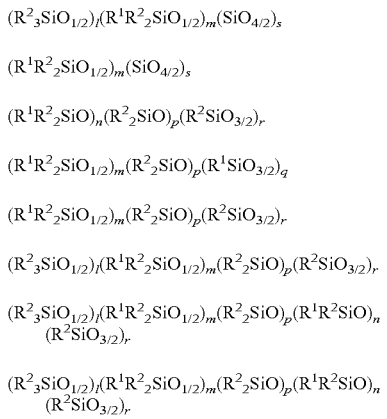

(wherein, $R^1$, $R^2$, l, m, n, p, q, r, and s are all as defined above in relation to the average composition formula (1))

More specific examples of the component (B) include the compounds shown below.

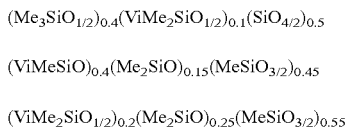

The ratio of the component (B) relative to the component (A) is an important factor within the present invention. The blend quantity of the component (B) must be within a range from 60 to 90 parts by mass, preferably from 65 to 80 parts by mass, and even more preferably 65 to 75 parts by mass, per 100 parts by mass of the combination of the component (A) and the component (B). If the blend quantity of the component (B) is less than 60 parts by mass, the targeted degree of hardness may be unattainable, whereas if the quantity exceeds 90 parts by mass, the viscosity of the composition increases markedly, making use of the composition as a die bonding material for LED elements and the like problematic.

The component (B) may be used either alone, or in combinations of two or more different compounds.

<Component (C)>

The component (C) functions as a cross-linking agent that undergoes cross-linking with the alkenyl groups of the component (A) and the component (B) via a hydrosilylation reaction, and also functions as a reactive diluent that dilutes the composition to a viscosity best suited to the intended application. The component (C) is represented by the above average composition formula (2), and is an organohydrogenpolysiloxane having at least 2, (typically within a range from 2 to 200), and preferably 3 or more (for example, from 3 to approximately 100) hydrogen atoms bonded to silicon atoms (that is, SiH groups) within each molecule.

The viscosity at 25° C. of the organohydrogenpolysiloxane of the component (C) is preferably no more than 1,000 mPa·s (typically within a range from 1 to 1,000 mPa·s), and even more preferably from 5 to 200 mPa·s.

In the component (C), the quantity of hydrogen atoms bonded to silicon atoms is preferably within a range from 0.001 to 0.02 mols, and even more preferably from 0.002 to 0.017 mols, per 1 g of the component (C).

In the average composition formula (2), the unsubstituted or substituted monovalent hydrocarbon groups that contain no alkenyl groups represented by $R^3$ are similar to those groups listed above as examples of silicon atom-bonded organic groups other than the alkenyl groups within the component (A), although at least 50 mol %, and typically from 60 to 100 mol %, of all the $R^3$ groups are methyl groups. If the proportion of methyl groups is less than 50 mol % of all the $R^3$ groups, then the compatibility with the component (A) and the component (B) deteriorates, which can cause the composition to become turbid or undergo phase separation.

a is preferably a number from 1.0 to 2.0, b is preferably from 0.01 to 1.0, and a+b is preferably a number within a range from 1.1 to 2.6.

The 2 or more, and preferably 3 or more hydrogen atoms bonded to silicon atoms (that is, SiH groups) within each molecule may be positioned at either the molecular chain terminals or non-terminal positions within the molecular chain, or may also be positioned at both these locations. Furthermore, the molecular structure of this organohydrogenpolysiloxane may be any one of a straight-chain, cyclic, branched, or three dimensional network structure, although the number of silicon atoms within the molecule (or the polymerization degree) is typically within a range from 2 to 400, preferably from 3 to 200, and even more preferably from 4 to approximately 100.

Specific examples of the organohydrogenpolysiloxane of the component (C) include 1,1,3,3-tetramethyldisiloxane, 1,3,5,7-tetramethylcyclotetrasiloxane, tris(hydrogendimethylsiloxy)methylsilane, tris(hydrogendimethylsiloxy)phenylsilane, methylhydrogencyclopolysiloxane, cyclic copolymers of methylhydrogensiloxane and dimethylsiloxane, methylhydrogenpolysiloxane with both molecular chain terminals blocked with trimethylsiloxy groups, copolymers of dimethylsiloxane and methylhydrogensiloxane with both terminals blocked with trimethylsiloxy groups, dimethylpolysiloxane with both terminals blocked with dimethylhydrogensiloxy groups, copolymers of dimethylsiloxane and methylhydrogensiloxane with both terminals blocked with dimethylhydrogensiloxy groups, copolymers of methylhydrogensiloxane and diphenylsiloxane with both terminals blocked with trimethylsiloxy groups, copolymers of methylhydrogensiloxane, diphenylsiloxane, and dimethylsiloxane with both terminals blocked with trimethylsiloxy groups, copolymers of methylhydrogensiloxane, methylphenylsiloxane, and dimethylsiloxane with both terminals blocked with trimethylsiloxy groups, copolymers of methylhydrogensiloxane, dimethylsiloxane, and diphenylsiloxane with both terminals blocked with dimethylhydrogensiloxy groups, copolymers of methylhydrogensiloxane, dimethylsiloxane, and methylphenylsiloxane with both terminals blocked with dimethylhydrogensiloxy groups, copolymers comprising $(CH_3)_2HSiO_{1/2}$ units, $(CH_3)_3SiO_{1/2}$ units, and $SiO_{4/2}$ units, copolymers comprising $(CH_3)_2HSiO_{1/2}$ units and $SiO_{4/2}$ units, and copolymers comprising $(CH_3)_2HSiO_{1/2}$ units, $SiO_{4/2}$ units, and $(C_6H_5)_3SiO_{1/2}$ units, as well as compounds represented by general formulas (6) and (7) shown below:

$$R^3{}_3SiO[SiR^3(H)O]_tSiR^3{}_3 \quad (6)$$

$$\text{cyclic } [SiR^3(H)O]_u \quad (7)$$

(wherein, $R^3$ is as defined above, t represents an integer from 2 to 30, and preferably from 2 to 25, and u represents an integer from 4 to 8), and compounds represented by the general formulas shown below:

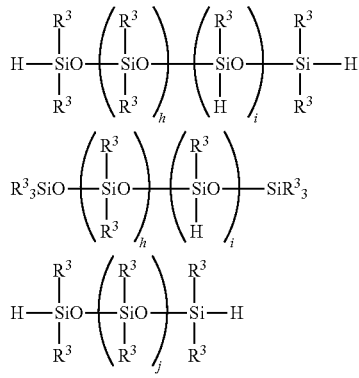

(wherein, $R^3$ is as defined above, h represents an integer from 5 to 40, i represents an integer from 5 to 20, and j represents an integer from 2 to 30).

Specific examples of the component (C) include compounds represented by the general formula (8) shown below:

$$Me_3SiO[SiMe(H)O]_tSiMe_3 \quad (8)$$

(wherein, t is as defined above),
and compounds represented by the structural formulas shown below.

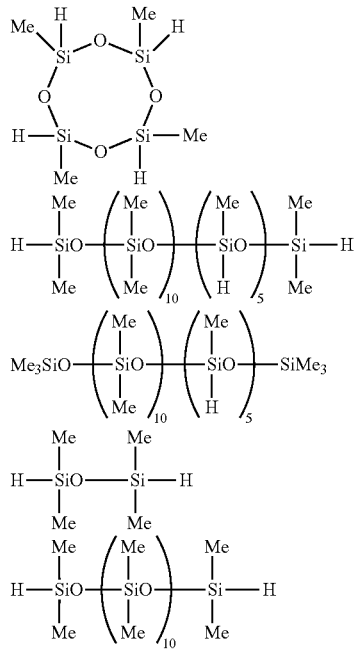

The blend quantity of the component (C) must be sufficient to provide from 0.5 to 5.0 mols, and preferably from 0.7 to 3.0 mols, of hydrogen atoms bonded to silicon atoms within the component (C) for every 1 mol of silicon atom-bonded alkenyl groups within the combination of the component (A) and the component (B). If this quantity does not satisfy this range from 0.5 to 5.0 mols, then the cross-linking balance may become unsatisfactory.

In a preferred embodiment, the blend quantity of the component (C) is sufficient to provide from 0.6 to 3.0 mols, and even more preferably from 0.7 to 2.0 mols, of hydrogen atoms bonded to silicon atoms within the component (C) for every 1 mol of silicon atom-bonded alkenyl groups within the entire composition. If this range is satisfied, then a composition with a viscosity that is ideal for subsequent use is obtained, and a cured product with the targeted degree of hardness can also be obtained.

The component (C) may be used either alone, or in combinations of two or more different compounds.

<Component (D)>

The platinum-group metal-based catalyst of the component (D) is for promoting and accelerating the hydrosilylation reaction between the aforementioned components (A) through (C).

There are no particular restrictions on the platinum-group metal-based catalyst, and suitable examples include platinum-group metals such as platinum, palladium, and rhodium; platinum compounds such as chloroplatinic acid, alcohol-modified chloroplatinic acid, and coordination compounds of chloroplatinic acid with olefins, vinylsiloxane, or acetylene compounds; and platinum-group metal compounds such as tetrakis(triphenylphosphine)palladium and chlorotris(triphenylphosphine)rhodium, although of these, a silicone-modified chloroplatinic acid is preferred, as it exhibits favorable compatibility with the components (A) through (C), and contains almost no chlorine impurities.

The blend quantity of the component (D) need only be an effective catalytic quantity, and a typical quantity, calculated as the mass of the platinum-group metal element relative to the combined mass of the components (A) through (C), is within a range from 3 to 100 ppm, and quantities from 5 to 40 ppm are preferred. By using an appropriate blend quantity, the hydrosilylation reaction can be accelerated effectively.

The component (D) may be used either alone, or in combinations of two or more different compounds.

<Other Components>

In addition to the components (A) through (D) described above, other components such as those described below can also be added to the composition of the present invention, provided such addition does not impair the object of the present invention.

Examples of these other components include thixotropic control agents such as fumed silica; light scattering agents such as crystalline silica; reinforcing agents such as fumed silica or crystalline silica; phosphors; viscosity control agents such as petroleum-based solvents, and unreactive silicone oils that contain no reactive functional groups; adhesion improvers such as silicone compounds other than the components (A) through (C) which contain at least one of a carbon functional silane, epoxy group, alkoxy group, silicon atom-bonded hydrogen atom (that is, SiH group), and alkenyl group such as a silicon atom-bonded vinyl group; conductivity imparting agents such as metal powders of silver or gold; pigments and dyes used for coloring; and reaction retarders such as tetramethyltetravinyltetracyclosiloxane.

These other components may be used either alone, or in combinations of two or more different materials.

<The Composition>

In a composition of the present invention, the fact that at least 80 mol % (80 to 100 mol %), and preferably 90 mol % or more (90 to 100 mol %) of all the monovalent hydrocarbon groups bonded to silicon atoms, other than alkenyl groups, are methyl groups ensures superior heat resistance and light resistance (ultraviolet light resistance), meaning the composition exhibits excellent resistance to deterioration, including discoloration, resulting from stress caused by heat or ultraviolet light.

Preparation Method

A composition of the present invention can be prepared by mixing together the components (A) through (D), and any other optional components as required, and in one suitable example, can be prepared by first preparing a part comprising the component (A) and the component (B), and a part comprising the component (C), the component (D) and any other components that may be used, and subsequently mixing these two parts together.

Curing Conditions

Curing of the composition can be conducted under conventional conditions, and for example, can be conducted by heating at a temperature of 60 to 180° C. for a period of 10 minutes to 3 hours. The Shore D hardness of the cured product obtained by curing the composition is preferably at least 30, and even more preferably 50 or higher, and typical curing conditions for ensuring the Shore D hardness is at least 30 involve heat curing the composition of the present invention at 120 to 180° C. for a period of 30 minutes to 3 hours.

Applications

A composition of the present invention is particularly useful as the die bonding material used in die bonding light-emitting elements such as LED elements and the like.

<Die Bonding Method>

The present invention also provides a die bonding method for a light-emitting element such as a LED element comprising the steps of:

applying a composition according to the present invention on a substrate to form a layer of the composition on the substrate, providing a light-emitting element such as an LED element on the composition layer, and curing the composition layer, whereby the light-emitting element being bonded to the substrate.

Specifically, in one example of a method of die bonding an LED element using a composition of the present invention, the composition of the present invention is first used to fill a syringe, the composition is applied to the surface of a substrate such as a package using a dispenser, in sufficient quantity to generate a dried coating of thickness 5 to 100 μm, an LED element is placed on top of the applied composition, and the composition is cured, thereby die bonding the LED element to the substrate. The curing conditions for the composition are as described above.

EXAMPLES

As follows is a description of specifics of the present invention using a series of examples, although the present invention is in no way limited by the examples presented below. In the examples, the term "SiH group" represents a hydrogen atom bonded to a silicon atom.

Example 1

A toluene solution of 75 parts by mass of a silicone resin comprising $Me_3SiO_{1/2}$ units, $ViMe_2SiO_{1/2}$ units, and $SiO_{4/2}$ units, and with a molar ratio of the combination of the $Me_3SiO_{1/2}$ units and $ViMe_2SiO_{1/2}$ units relative to the $SiO_{4/2}$ units of 0.8 (quantity of vinyl groups per 100 g of this silicone resin: 0.074 mols, solid at 23° C.) was mixed with 25 parts by mass of a straight-chain dimethylpolysiloxane with both terminals blocked with dimethylvinylsiloxy groups and with a viscosity at 25° C. of 70 mPa·s. The toluene was removed from the resulting liquid mixture by treatment at 120° C. under a reduced pressure of no more than 10 mmHg, thereby yielding a liquid that was viscous at room temperature.

100 parts by mass of this viscous liquid was mixed with 3 parts by mass of tetramethyltetravinyltetracyclosiloxane and 10 parts by mass of a methylhydrogensiloxane with both terminals blocked with trimethylsiloxy groups, as represented by an average structural formula (9) shown below:

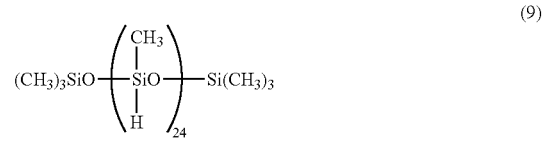

(9)

(quantity of SiH groups per 1 g of this methylhydrogensiloxane: 0.015 mols), thereby yielding a transparent liquid mixture. To this liquid mixture was added a toluene solution of a chloroplatinic acid-derived platinum catalyst containing tetramethylvinyldisiloxane ligands, in sufficient quantity to provide a mass of platinum element equivalent to 10 ppm, and the mixture was then stirred to generate a uniform mixture, thus completing preparation of the composition. Subsequently, the composition was poured into a mold, and then cured by heating at 150° C. for 2 hours, thus forming a sheet-like molded product with a thickness of 2 mm.

In the composition, the number of mols of SiH groups within the component (C) per 1 mol of all the silicon atom-bonded vinyl groups within the component (A) and the component (B) was 2.06 mols, and the number of mols of SiH groups within the component (C) per 1 mol of all the vinyl groups in the entire composition was 1.38.

Example 2

A toluene solution of 75 parts by mass of a silicone resin comprising $Me_3SiO_{1/2}$ units, $ViMe_2SiO_{1/2}$ units, and $SiO_{4/2}$ units, and with a molar ratio of the combination of the $Me_3SiO_{1/2}$ units and $ViMe_2SiO_{1/2}$ units relative to the $SiO_{4/2}$ units of 0.8 (quantity of vinyl groups per 100 g of this silicone resin: 0.074 mols, solid at 23° C.) was mixed with 25 parts by mass of a straight-chain dimethylpolysiloxane with both terminals blocked with dimethylvinylsiloxy groups and with a viscosity at 25° C. of 70 mPa·s. The toluene was removed from the resulting liquid mixture by treatment at 120° C. under a reduced pressure of no more than 10 mmHg, thereby yielding a liquid that was viscous at room temperature.

100 parts by mass of this viscous liquid was mixed with 3 parts by mass of tetramethyltetravinyltetracyclosiloxane, 4 parts by mass of the methylhydrogensiloxane with both terminals blocked with trimethylsiloxy groups represented by the average structural formula (9) shown above (quantity of SiH groups per 1 g of this methylhydrogensiloxane: 0.015 mols), and 7 parts by mass of an epoxy group-containing siloxane compound represented by a structural formula shown below:

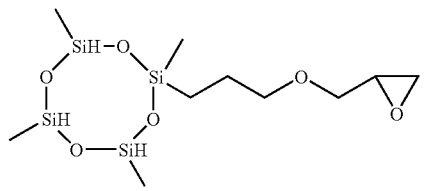

thereby yielding a transparent liquid mixture. To this liquid mixture was added a toluene solution of a chloroplatinic acid-derived platinum catalyst containing tetramethylvinyldisiloxane ligands, in sufficient quantity to provide a mass of platinum element equivalent to 10 ppm, and the mixture was then stirred to generate a uniform mixture, thus completing preparation of the composition. Subsequently, the composition was poured into a mold, and then cured by heating at 150° C. for 2 hours, thus forming a sheet-like molded product with a thickness of 2 mm.

In the composition, the number of mols of SiH groups within the component (C) per 1 mol of all the silicon atom-bonded vinyl groups within the component (A) and the component (B) was 1.67 mols, and the number of mols of SiH groups within the component (C) per 1 mol of all the vinyl groups in the entire composition was 1.12.

Comparative Example 1

A toluene solution of 75 parts by mass of a silicone resin comprising $Me_3SiO_{1/2}$ units and $SiO_{4/2}$ units, wherein the molar ratio of $Me_3SiO_{1/2}$ units: $SiO_{4/2}$ units was 0.8:1 was mixed with 25 parts by mass of a straight-chain dimethylpolysiloxane with both terminals blocked with dimethylvinylsiloxy groups and with a viscosity at 25° C. of 70 mPa·s. The toluene was removed from the resulting liquid mixture by treatment at 120° C. under a reduced pressure of no more than 10 mmHg, thereby yielding a liquid that was viscous at room temperature.

100 parts by mass of this viscous liquid was mixed with 3 parts by mass of tetramethyltetravinyltetracyclosiloxane and 3 parts by mass of the methylhydrogensiloxane with both terminals blocked with trimethylsiloxy groups represented by the average structural formula (9) shown above (quantity of SiH groups per 1 g of this methylhydrogensiloxane: 0.015 mols), thereby yielding a transparent liquid mixture. To this liquid mixture was added a toluene solution of a chloroplatinic acid-derived platinum catalyst containing tetramethylvinyldisiloxane ligands, in sufficient quantity to provide a mass of platinum element equivalent to 10 ppm, and the mixture was then stirred to generate a uniform mixture, thus completing preparation of the composition. Subsequently, the composition was poured into a mold, and then cured by heating at 150° C. for 2 hours, thus forming a sheet-like molded product with a thickness of 2 mm.

In the composition, the number of mols of SiH groups within the component (C) per 1 mol of all the silicon atom-bonded vinyl groups within the component (A) and the component (B) was 0.62 mols, and the number of mols of SiH groups within the component (C) per 1 mol of all the vinyl groups in the entire composition was 0.41. These ratios were determined on the assumption that the component (B) was a silicone resin comprising $Me_3SiO_{1/2}$ units and $SiO_{4/2}$ units, with a molar ratio of $Me_3SiO_{1/2}$ units $SiO_{4/2}$ units of 0.8:1.

Comparative Example 2

A toluene solution of 75 parts by mass of a silicone resin comprising $Me_3SiO_{1/2}$ units, $ViMe_2SiO_{1/2}$ units, and $SiO_{4/2}$ units, and with a molar ratio of the combination of the $Me_3SiO_{1/2}$ units and $ViMe_2SiO_{1/2}$ units relative to the $SiO_{4/2}$ units of 0.8 (quantity of vinyl groups per 100 g of this silicone resin: 0.074 mols, solid at 23° C.) was mixed with 25 parts by mass of a straight-chain dimethylpolysiloxane with both terminals blocked with dimethylvinylsiloxy groups and with a viscosity at 25° C. of 5,000 mPa·s. The toluene was removed from the resulting liquid mixture by treatment at 120° C. under a reduced pressure of no more than 10 mmHg, thereby yielding a liquid that was viscous at room temperature.

100 parts by mass of this viscous liquid was mixed with 3 parts by mass of tetramethyltetravinyltetracyclosiloxane and 8 parts by mass of the methylhydrogensiloxane with both terminals blocked with trimethylsiloxy groups represented by the average structural formula (9) shown above (quantity of SiH groups per 1 g of this methylhydrogensiloxane: 0.015 mols), thereby yielding a transparent liquid mixture. To this liquid mixture was added a toluene solution of a chloroplatinic acid-derived platinum catalyst containing tetramethylvinyldisiloxane ligands, in sufficient quantity to provide a mass of platinum element equivalent to 10 ppm, and the mixture was then stirred to generate a uniform mixture, thus completing preparation of the composition. Subsequently, the composition was poured into a mold, and then cured by heating at 150° C. for 2 hours, thus forming a sheet-like molded product with a thickness of 2 mm.

In the composition, the number of mols of SiH groups within the component (C) per 1 mol of all the silicon atom-bonded vinyl groups within the component (A) and the component (B) was 2.06 mols, and the number of mols of SiH groups within the component (C) per 1 mol of all the vinyl groups in the entire composition was 1.27. These ratios were determined on the assumption that the component (A) was a straight-chain dimethylpolysiloxane with both terminals blocked with dimethylvinylsiloxy groups and with a viscosity at 25° C. of 5,000 mPa·s.

<Measurement Methods>

The hardness and light transmittance of the sheet-like molded products obtained above were measured in accordance with the methods described below. The results are shown in Table 1. All those cured products for which the light transmittance was at least 75% appeared highly transparent on visual inspection.

1. Hardness

Hardness was measured using a Shore D hardness meter.

2. Light Transmittance

Each sheet-like molded product was mounted in a spectrophotometer, and the light transmittance (initial, and then after heating) of a direct light beam through the 2 mm thick cured product was measured, with the light transmittance at 400 nm and 300 nm being used as indicators. The measurement of the light transmittance (initial) was conducted on the sheet-like molded product immediately following curing. Furthermore, the measurement of the light transmittance (after heating) was conducted on a sheet-like molded product that had been allowed to stand at 150° C. for 500 hours in a dryer.

TABLE 1

| Item | | Example 1 | Example 2 | Comparative example 1 | Comparative example 2 |
| --- | --- | --- | --- | --- | --- |
| Hardness (Shore D hardness) | | 58 | 54 | 22 | 18 |
| Light transmittance (initial) (%) | 400 nm | 91 | 91 | 91 | 91 |
| Light transmittance (after heating) (%) | | 89 | 84 | 90 | 88 |
| Light transmittance (initial) (%) | 300 nm | 85 | 86 | 84 | 86 |
| Light transmittance (after heating) (%) | | 75 | 75 | 75 | 73 |

What is claimed is:

1. A silicone resin composition for die bonding, comprising:
   (A) a straight-chain dimethylpolysiloxane with both terminals blocked with dimethylvinylsiloxy groups, and having formula (4):

$$Vi(R^6)_2SiO[Si(R^6)_2O]_eSi(R^6)_2Vi$$

wherein each $R^6$ represents, independently, a methyl group, Vi represents a vinyl group, and e is an integer which provides the straight-chain dimethylpolysiloxane of formula (4) with a viscosity at 25° C. of 5 to 700 mPa·s
   (B) a three dimensional network organopolysiloxane resin that is in the form of a gum with a viscosity at 23° C. of at least 10,000,000 mPa·s or solid at 23° C., and is at least one selected from the group consisting of:

$$(Me_3SiO_{1/2})_l(ViMe_2SiO_{1/2})_m(SiO_{4/2})_s,$$

wherein Me represents a methyl group, Vi represents a vinyl group, and l, m and s are numbers that satisfy $0.65 \geq l \geq 0.392$, $0.65 \geq m \geq 0.052$, $0.6 \geq s \geq 0.2$, and $l+m+s=1$;

$$(ViMeSiO)_n(Me_2SiO)_p(MeSiO_{3/2})_r,$$

wherein Me represents a methyl group, Vi represents a vinyl group, and n, p and r are numbers that satisfy $0.5 \geq n \geq 0.2$, $0.5 \geq p \geq 0.15$, $0.6 \geq r \geq 0.2$, and $n+p+r=1$; and $$(ViMe_2SiO_{1/2})_m(Me_2SiO)_p(MeSiO_{3/2})_r,$$

wherein Me represents a methyl group, Vi represents a vinyl group, and m, p and r are numbers that satisfy $0.65 \geq m \geq 0.2$, $0.5 \geq p \geq 0.2$, $0.6 \geq r \geq 0.2$, and $m+p+r=1$;
   in sufficient quantity to provide from 60 to 90 parts by mass of component (B) per 100 parts by mass of a combination of said component (A) and said component (B),
   (C) an organohydrogenpolysiloxane having at least 2 hydrogen atoms bonded to silicon atoms within each molecule, represented by the general formula (8) shown below:

$$Me_3SiO[SiMe(H)O]_tSiMe_3 \quad (8)$$

wherein Me represents a methyl group, t represents an integer from 2 to 30, in sufficient quantity to provide from 0.5 to 5.0 mols of hydrogen atoms bonded to silicon atoms within component (C) for every 1 mol of silicon atom-bonded alkenyl groups within a combination of said component (A) and said component (B), and
   (D) an effective quantity of a platinum-group metal-based catalyst.

2. The composition according to claim 1, wherein a Shore D hardness value of a cured product produced by curing said composition is at least 30.

3. A die bonding method comprising the steps of:
   applying a composition according to claim 1 on a substrate to form a layer of the composition on the substrate,
   providing a light-emitting element on the composition layer, and
   curing the composition layer, whereby the light-emitting element is bonded to the substrate.

4. A cured die bonding material formed by curing a composition according to claim 1 between a light-emitting element and a substrate.

5. The composition according to claim 1, wherein the organohydrogenpolysiloxane (C) is present in an amount to provide from 1.12 to 5.0 mols of hydrogen atoms bonded to silicon atoms for every one mol of silicon atom-bonded alkenyl group.

6. The composition according to claim 1, wherein the organohydrogenpolysiloxane (C) is present in an amount to provide from 1.38 to 5.0 mols of hydrogen atoms bonded to silicon atoms for every one mol of silicon atom-bonded alkenyl groups.

7. A cured composition obtained by curing the composition of claim 1.

8. The cured composition of claim 7, having a Shore D hardness of 50 or higher.

9. The cured composition of claim 7, having a Shore D hardness of 54 or higher.

10. The composition according to claim 1, wherein the three dimensional network-type organopolysiloxane resin (B) is present in an amount of from 65 to 75 parts by mass per 100 parts by mass of the combination of the straight-chain organopolysiloxane (A) and the three dimensional network-type organopolysiloxane resin (B).

11. The composition according to claim 1, wherein the three dimensional network-type organopolysiloxane resin is at least one selected from the group consisting of $(Me_3SiO_{1/2})_{0.4}(ViMe_2SiO_{1/2})_{0.1}(SiO_{4/2})_{0.5}$, $(ViMeSiO)_{0.4}(Me_2SiO)_{0.15}(MeSiO_{3/2})_{0.45}$, and $(ViMe_2SiO_{1/2})_{0.2}(Me_2SiO)_{0.25}(MeSiO_{3/2})_{0.55}$; wherein Me is a methyl group and Vi is a vinyl group.

12. The composition according to claim 1, wherein the organohydrogenpolysiloxane has at least three hydrogen atoms bonded to silicon atoms.

13. The composition according to claim 1, wherein the platinum-group metal-based catalyst is a silicone-modified chloroplatinic acid.

14. The composition according to claim 1, wherein the component (B) contains $(SiO_{4/2})$ units as an essential unit.

15. The composition according to claim 1, wherein the blend quantity of the component (B) is within a range from 65 to 90 parts by mass per 100 parts by mass of the combination of the component (A) and the component (B).

16. The composition according to claim 1, wherein the three dimensional network-type organopolysiloxane resin of the component (B) is at least one selected from the group consisting of:

$$(Me_3SiO_{1/2})_l(ViMe_2SiO_{1/2})_m(SiO_{4/2})_s,$$

wherein Me represents a methyl group, Vi represents a vinyl group, and l, m and s are numbers that satisfy $0.4 \geq l \geq 0.392$, $0.1 \geq m \geq 0.052$, $0.6 \geq s \geq 0.5$, and $l+m+s=1$, $$(ViMeSiO)_n(Me_2SiO)_p(MeSiO_{3/2})_r,$$

wherein Me represents a methyl group, Vi represents a vinyl group, and n, p and r are numbers that satisfy $0.4 \geq n \geq 0.2$, $0.5 \geq p \geq 0.2$, $0.6 \geq r \geq 0.45$, and $n+p+r=1$, and $$(ViMe_2SiO_{1/2})_m(Me_2SiO)_p(MeSiO_{3/2})_r,$$

wherein Me represents a methyl group, Vi represents a vinyl group, and m, p and r are numbers that satisfy $0.25 \geq m \geq 0.2$, $0.25 \geq p \geq 0.2$, $0.6 \geq r \geq 0.55$, and $m+p+r=1$.

17. The composition according to claim 1, wherein the three dimensional network-type organopolysiloxane resin of the component (B) is at least one selected from the group consisting of:

$$(Me_3SiO_{1/2})_l(ViMe_2SiO_{1/2})_m(SiO_{4/2})_s,$$

wherein Me represents a methyl group, Vi represents a vinyl group, and l, m and s are numbers that satisfy $0.4 \geq l \geq 0.392$, $0.1 \geq m \geq 0.052$, $0.6 \geq s \geq 0.5$, and $l+m+s=1$.

* * * * *